Patented June 26, 1928.

1,675,308

UNITED STATES PATENT OFFICE.

ALPHONS O. JAEGER, OF PITTSBURGH, PENNSYLVANIA, ASSIGNOR TO THE SELDEN COMPANY, OF PITTSBURGH, PENNSYLVANIA, A CORPORATION OF DELAWARE.

CONTACT SULPHURIC-ACID PROCESS. REISSUED

No Drawing.   Application filed August 3, 1927.   Serial No. 210,462.

This invention relates to the catalytic oxidation of sulphur dioxide to sulphur trioxide, the so called contact sulphuric acid process.

According to the present invention, gaseous mixtures of sulphur dioxide and oxygen are oxidized catalytically at the usual elevated reaction temperatures in the presence of catalysts which when freshly prepared, contain catalytically active diluted or undiluted non-silicious base exchange bodies or their derivatives, some of which new catalysts have been described and claimed as products in my co-pending application, Serial No. 171,727, filed February 28, 1927, of which the present application is in part a continuation.

Such non-silicious base exchange bodies can be produced by the reaction of alkaline solutions of amphoteric metal hydroxides with non-alkaline solutions of other metal compounds which are capable of precipitating the first, the proportions of the two classes of components being chosen so that the resulting mixtures are substantially alkaline to litmus. One or more of the metals thus introduced should preferably be catalytically active in the oxidation of sulphur dioxide to sulphur trioxide. Catalysts can be produced by bringing about the reaction between a single metallate and a single metal salt, one or both being catalytically active, or a plurality of metallates or a plurality of different metal salts can be used. In some cases the same metal may be present both as metallate and as a metal salt. In the case of some amphoteric metals, metallates and metal salts can be used in which the metal has the same valence. In the case of other metals, metallates are formed in one state of oxidation and metal salts at a different stage of oxidation, usually a lower one.

All of the base exchange bodies used in the present invention, that is to say, catalytically active bodies which are prepared by the reaction of a single metallate with a single metal salt or bodies produced by the reaction of at least one metallate with a plurality of metal salts, or vice versa, possess a remarkably porous, frequently microporous structure and in some cases are opalescent. When suitable catalytically active components are present in the products, they form catalysts of remarkable efficiency due probably to the extraordinarily high surface energy of the microscopically porous structures and probably also to the presence of unsaturated valences in many cases and asymmetry of molecules. It is of course possible that the catalytic activity of the products is due partly or wholly also to other reasons, and the present invention is not intended in any sense to be limited by any theory of action of the products. The molecular complexes which are present are apparently of great size and complexity, and the exact chemical constitution has not been determined. In fact it is not definitely determined whether single chemical compounds are formed in any or all cases and it is possible that molecular mixtures are present. The products possess a physically microscopical homogeneity and behave in many ways as if they were single compounds, and I am of the opinion that probably in many cases the products are in fact single compounds of very high molecular weight but the invention is not limited to any theories of the chemical constitution of the products.

It should be clearly understood that the products used in the present invention are chemically quite distinct from base exchanging bodies containing silicon, such as for example the zeolites and related base exchange bodies and their derivatives. The present compounds contain no silicon in their structure, and while they share many of the physical properties of zeolites, namely, the highly porous structure and the power of exchanging their alkali cations for other cations by base exchange, they are chemically distinct products. Surprising as it may seem, the presence of silicon, which has hitherto been considered as essential to the formation of skeletons of such advantageous physical structure, appears to be only one of many elements which are capable of forming products having these physical properties, and many of the base exchange bodies used in the present invention possess the mechanical strength and resistance of the silicious zeolities, properties which are of course of utmost importance in the contact sulphuric acid process.

A number of elements are capable of forming alkali metal metallates, at least in their higher states of oxidation, and can be used singly or in mixtures, as the metallate components for producing base exchange bodies used in the present invention, it being understood of course that the choice will depend on the metal salts to be used and on the catalytic effects which it is desired to produce. Among the elements which form metallates are the following:—aluminum, chromium, zinc, vanadium, beryllium, tin, palladium, platinum, titanium, zirconium, tungsten, lead, uranium, tantalum, boron, molybdenum. The elements which form the metallates may be present in the form of their oxides or hydroxides united with alkali to form simple metallates, or they may be present partly or wholly in the form of complex compounds, such as for example, ammonia complexes, cyanogen complexes, and the like. In general, the complex compounds described in the co-pending application of Jaeger and Bertsch, Serial No. 100,116, filed April 19, 1926, may be used.

The metal salt components include the water soluble neutral or acid salts of the following elements:—copper, silver, gold, beryllium, zinc, cadmium, aluminum, rare earths, titanium, zirconium, tin, lead, thorium, chromium, uranium, vanadium, manganese, iron, nickel, cobalt, platinum, palladium, which may be used singly or in any desired mixture. It is an advantage of the present invention that definite proportions of the individual compounds do not need to be used, either because mixtures of different compounds are formed, or more probably because the tremendous size and complexity of the molecule masks any requirements for definite proportions.

All of the products used in the present invention possess base exchanging powers to a greater or less extent when first prepared in solutions which are substantially neutral or alkaline to phenolphthalein. For the contact sulphuric acid process, however, the base exchanging power of the products is not required in the catalytic reaction itself and it is therefore possible to depart considerably from the optimum conditions of production as far as base exchange power goes. In other words, the limits of alkalinity, neutrality or acidity are much wider than softening, and which therefore depend primarily on their base exchanging power. While usually the highest base exchanging powers are obtained when the compounds are produced in a reaction mixture which is substantially neutral or alkaline to phenolphthalein products having a similar physical structure and being desirable for the contact sulphuric acid process can be prepared with somewhat different proportions of the components, so that at the end of the reaction the mixture may possess any alkalinity or acidity between phenolphthalein red and litmus blue as indicator end points.

The possibilities of producing catalysts according to the present invention are not limited to the reaction products of the metallates and metal salt components which may be used and which are present in the molecules in a non-exchangeable form. On the contrary, a further series of products can be prepared by exchanging part or all of the alkali cations for other atoms or radicals by means of base exchange. The number of cations which can be introduced is very large, and some of them are included in the following elements and radicals:—ammonium, copper, silver, gold, beryllium, magnesium, caesium, zinc, strontium, cadmium, barium, aluminum, thallium, titanium, zirconium, tin, thorium, vanadium, chromium, uranium, manganese, iron, cobalt, nickel, palladium, platinum. These cations may be introduced either singly or in mixtures, simultaneously or successively. The wide possibilities of combination which can be effected by the introduction of various cations by means of base exchange gives the catalytic chemist an almost infinite field of choice in preparing catalysts having just the right degree of activity for the contact sulphuric acid process and it is an advantage of the present invention that catalysts of exceedingly finely adjusted activity can be produced and are effective. The cations introduced by base exchange may be themselves catalytically active, or they may activate catalytic components which are present in the products in non-exchangeable form. Cations may also be introduced as simple ions or as complex ions. In all cases, the catalytic activity of the products obtained is enhanced by the favorable physical structure of the base exchange body.

A further series of products can be obtained by treating the base exchange bodies used in the present invention either with or without the presence of cations introduced by base exchange, with products containing anions which are capable of reacting with the base exchange body to form salt-like products. In the contact masses containing salt-like bodies, which are used in the present invention, the catalytically effective components may be present solely in the base exchange body, solely in the anion of the salt-like body or partly in one and partly in the other. Acid radicals of the following elements, either simple acids, polyacids or complex anions, can be used in producing salt-like bodies with the base exchange bodies of the present invention:—vanadium, tungsten, uranium, chromium, molybdenum, maganese, tantalum, titanium, bismuth, sulphur, chlorine, platinum, boron. Complex ions, such as for example, ferro and ferricyanogen, sulphocyanogen, metal cyanogen, and the like, may also be used wherever they form salt-like bodies with the base exchanging bodies of the present invention. A single acid radical may be introduced, or a mixture may be had, either by a simultaneous or successive treatment. The amount of the acid radical used may also be varied so that the products may possess the character of acid, neutral or basic salts.

While the number of catalytically active or activating elements which can be introduced is very large, I have found that the most effective and satisfactory catalysts are those which contain vanadium, with or without other catalytically active elements. The present invention is not limited in its broader aspects to the use of non-silicious base exchange contact masses in which vanadium is present, but in its more specific embodiments such vanadium-containing contact masses are included, and constitute the preferred contact masses for the present invention.

While it is possible to use certain of the catalysts of the present invention in an undiluted form, best results are usually obtained by the dilution of the products with more or less inert bodies, or with bodies of relatively feeble catalytic powers or activating powers. Diluents can be incorporated with the catalytically active base exchange body before or after formation, and are preferably although not necessarily, incorporated therewith to produce a physically homogeneous structure. In addition to finely divided carriers, diluted or undiluted catalytically active base exchange bodies can be coated on or impregnated in relatively massive carrier fragments, the incorporation taking place before, during or after formation of the base exchange body. It should be understood of course in all cases that where a perfectly homogeneous product is desired, the incorporation of diluents must take place before the base exchange body after formation has set. Practically all of the base exchange bodies used in the present invention are first formed as gels, in which condition they can be incorporated with diluents or carrier bodies, but after once setting, and particularly after drying, it is of course impossible to incorporate diluents into the base exchange body other than by purely physical mixture, which in general is less desirable, but which is not excluded from the broader aspects of the present invention.

A large number of diluent bodies can be used, such as silicious materials, as kieselguhrs of all kinds diatomite brick refuse, pumice meal, pulverized quartz, sand, and other minerals, especially those rich in silica. In the same way, a large number of natural or artificial massive carrier fragments can be used, such as fragments of pumice, diatomite bricks or other minerals, metal granules and the like. In general, the methods of incorporation and many of the diluents which can be used are described in the copending application of Jaeger and Bertsch, Serial No. 95,771, filed March 18, 1926.

The high porosity of the products which are prepared may be even further increased by incorporating into the framework of the base exchange body products which can be removed by leaching, volatilization or combustion, and which when removed leave additional porous spaces and produce an even more advantageous physical structure. The substances added may be of organic or inorganic nature and may be added as individuals or may be in chemical combination with some of the permanent components. Thus for example, certain of the components may be introduced in the form of complex compounds which are later decomposed and then leave additional porous spaces. Examples of such complex compounds are certain ammonia complexes which can be decomposed by heating the finished product.

In general the reaction of the component solutions results in the production of soluble salts which are not wanted, and it is therefore usually desirable to wash the base exchange body, after precipitation and then to dry, or dry first and then wash. I have found that while it is possible in some cases to dry at high temperature, for the best results, in most cases drying temperatures of 100° C., or less, are desirable.

In the general methods described above, separately prepared metallate components and metal salt components have been caused to react. While for many purposes these are the preferred methods, it is possible to prepare base exchange bodies by somewhat different methods. Thus for example, if a solution of a metallate or amphoteric metals is cautiously neutralized with acid until the strongly alkaline reaction becomes weakly alkaline to phenolphthalein, or even slightly acid with weak alkalinity to litmus, as a limit, base exchange bodies are produced, and in many cases are of importance, particularly for the contact sulphuric acid process. Instead of the metallates, the amphoteric metals may also be present in the form of complex metallate compounds, for example, such complex compounds as are described in the co-pending application of Jaeger and Bertsch, referred to above.

In a similar manner, acid or neutral solutions of salts of amphoteric metals may be treated with alkali until the mixture becomes neutral or alkaline to phenolphthalein, or even acid, in which case base exchange bodies are produced in a manner similar to that described in the foregoing paragraph. The base exchange bodies produced either by neutralizing metallate solutions or metal salt solutions in general do not show quite as great base exchange power as do those which are prepared by causing ready made metallate and metal salt solutions to react with each other. The physical structure however, appears to be similar and, as in many cases, particularly the contact sulphuric acid process, extremely high base exchange power is not essential. Many very valuable catalysts can be produced in this manner.

A further wet preparation consists in causing alkali metal salts of the oxygen-containing acids of metal elements of the fifth and sixth group of the periodic system, such as for example, vanadium, molybdenum, tantalum, tungsten, and the like, to react with neutral or acid salts of metals, particularly metals which are strongly amphoteric. Preferably there should be an excess of alkali. The salts of the fifth and sixth group metal acids may be used alone or in combination with other metallates.

In addition to the wet methods, which for most purposes I find are preferable, base exchange bodies can be produced by fusion methods; for example, by fusing oxides or hydroxides of the metallate and metal salt components with alkali, for example, sodium carbonate or potassium carbonate or other hydroxides. The base exchange bodies produced by fusion, while sometimes they do not possess quite as high base exchange powers, are nevertheless of a similar advantageous physical structure, and many of the products are very valuable catalysts. Oxides of the metals of the fifth and sixth group may also be used to form products somewhat similar to those described in the preceding paragraph by fusion methods.

Many of the base exchange bodies used in the present invention possess sufficient mechanical strength, but in some cases, for example in certain cases of high dilution, the mechanical resistance may be insufficient, and in such cases the products may be washed with a dilute solution of waterglass, producing a surface silicification which adds greatly to the mechanical strength of the product. Solutions of alkali and alkaline earth metal compounds are also desirable.

I have found it is usually desirable, although not in all cases essential, to calcine the contact masses used in the present invention, and to subject them to a preliminary treatment with acid gases, such as for example $SO_2$ and air, before they are used for the catalytic oxidation of sulphur dioxide. While this constitutes the preferred embodiment of the present invention, the latter is not limited thereto, and in some cases it is possible or even desirable to omit the preliminary treatment, such processes being of course included within the scope of the present invention.

The range of catalytically active elements which can be incorporated into non-silicious base exchange bodies used in the present invention is of course very wide, and includes not only vanadium in different stages of oxidation and allied catalytic elements, but also platinum and the platinum metals. In its broader aspects therefore the invention is not limited to a non-platinum catalyst, as the advantages of high porosity, mechanical strength, atomic dispersion of the catalytically active atoms throughout the framework of the large base exchange molecule enhance the activity of platinum and platinum metals as they do other catalytic elements. The non-platinum contact masses of the present invention, and particularly those containing vanadium, possess the important advantage over the platinum catalysts now in use that they are substantially insensitive to the poisons which will rapidly ruin the ordinary platinum catalysts, such as volatile metalloids, as for example, arsenic and chlorine, acid compounds, such as hydrochloric acid, and the like, and similar poisons. It is therefore an important advantage of the preferred embodiments of the present invention, that it is possible to carry out the contact sulphuric acid process, even when using raw materials which are relatively high in components which yield catalyst poisons for platinum, without any chemical purification, it being only necessary to remove mechanically entrained dust, which might tend to clog the catalyst. Since the elaborate purification installations where platinum catalysts are used constitute quite a notable investment, the feature of their elimination which is possible with the preferred catalysts of the present invention, is of very great economic importance.

The great resistance to high temperatures of the catalysts used in the present invention, and particularly the vanadium-containing base exchange bodies, is another very practical advantage of the process of the present invention, as it renders an accurate temperature control less necessary, and the bad results from occasional heating are minimized. It is thus possible to operate the process with less care and less supervision than where more delicate catalysts are used, which correspondingly simplifies and cheapens the process according to the present invention over those hitherto used.

A further advantage of the present invention over most of the catalysts used in the past, such as for example platinized asbestos, one of the best known and most effective of the catalysts used in the past, lies in the fact that it is possible to produce the contact masses used in the present invention in the form of granules, which can be readily filled into converters, and which do not tend to mat down and thus increase the resistance to the passage of gases therethrough. This renders the periodic removal and regeneration of the catalyst necessary at less frequent intervals, and when so removed it is usually only necessary to sift the catalyst to remove the small proportion which may be crumbled in years of use. Contact masses such as platinized asbestos, however, cannot be so treated, and it is necessary to recover the platinum and to make new contact masses, a procedure which entails quite a serious loss of active material.

The diluents referred to above are for the most part catalytically ineffective, but the invention is not limited to processes in which the effective catalytic components reside solely in the non-silicious base exchange-body, and in some cases it is desirable to incorporate catalytically effective components into the diluents, which may be effected in any suitable manner, as described fully in my co-pending application, Serial No. 174,414, filed March 10, 1927, in which I have described and claimed processes for the catalytic oxidation of sulphur dioxide in the presence of catalysts containing catalytically ineffective base exchange bodies united with catalytically effective diluents. I do not claim here broadly, processes in which non-silicious base exchange bodies are used in combination with catalytically effective diluents.

The base exchange bodies used in the present invention for the most part contain exchangeable bases which are not catalytically active, and which act as stabilizers, moderating and tuning the action of the catalytic components. Among such stabilizers are the alkali metals, the alkaline earth metals, many of the earth metals, and similar strong chemical bases which may be present in the form of their salts or other compounds. Many of the amphoteric metal components of the base exchange bodies which are not catalysts of sufficient activity to be commercially usable but which possess some catalytic powers, appear to enhance and tune the stabilizing action of the strong bases present, and I have termed such ineffective catalytic components stabilizer promoters. The diluents may also be rich in stabilizer promoters, such as for example oxides or compounds of some of the heavy metals, and the like.

Example 1.

40 parts of $V_2O_5$ are suspended in 500 parts of water and acidified with a little concentrated sulphuric acid. The suspension is heated almost to boiling and gases containing $SO_2$ are passed through until the vanadic acid suspension is completely dissolved as blue vanadyl sulphate. Sometimes it is necessary to add some water in order to get the vanadyl sulphate entirely dissolved.

The blue solution is then divided into two parts, one of which is kept as such, and the other treated with 5 N. potassium hydroxide solution at 50 to 60° C. until a clear coffee brown solution of potassium vanadite is obtained.

The vanadite solution is mixed with 70 parts of small diatomite brick fragments or 40 parts of "Celite" and 40 parts of quartz particles, the mixture being stirred until it becomes uniform. Other dilutent bodies such as neutral silicates, sand, silica gel, ground rocks, tuffs, lava of volcanic or eruptive origin, or similar materials may be used. To the solution containing potassium vanadite the second half of the vanadyl sulphate solution is added, care being taken that even after all of the vanadyl sulphate has been added, the solution remains alkaline or neutral to phenolphthalein. The reaction product, after separation from the mother liquor by filtration is dried at 60 to 70° C., and broken into fragments and constitutes a base exchange body, containing potassium and tetravalent vanadium, part of the vanadium playing the part of an acid radical and part of a base in the non-exchangeable portion of the molecule.

The product obtained after calcination with air and $SO_2$ gases diluted with air at 400 to 500° C., is well suited for the catalytic oxidation of sulphur dioxide to sulphur trioxide, 6 to 8 per cent burner gases being passed over the contact mass at 420 to 500° C.

Example 2.

A diluted vanadyl base exchange body is prepared as described in Example 1, and is afterwards sprayed with 3–5% inorganic acids, such as, for example, sulphuric acid, hydrochloric acid, or the like until the alkali in the exchangeable part of the base exchange body has been neutralized and a so-called salt-like body is obtained.

The product so obtained without further treatment is well suited for the catalytic oxidation of sulphur dioxide to sulphur trioxide using 6 to 8% burner gases passed over the contact mass at a temperature of 420 to 550° C. A high percentage conversion to $SO_3$ is obtained.

Example 3.

A diluted vanadyl base exchange body, as described in Example 1, or its salt-like body, as described in Example 2, is coated onto massive carrier fragments of natural or artificial origin, such as, for example, materials rich in silica as quartz fragments, quartz filter stones, sand stones, fragments of silica gel, diatomaceous stones, "Celite" bricks, pumice fragments, fragments of natural or artificial silicates and diluted or undiluted zeolites, metals such as aluminum granules, metal alloys, such as ferrosilicon, ferrovanadium, ferrochrome, and the like, particularly when their surface has been roughened.

The coating can take place either after formation of the product, or the product can be caused to react on the carrier fragments and be generated in situ.

Artificial carrier fragments can also be prepared, for example, by forming fragments of "Celite", kieselguhr, pulverized quartz, silica gel, pulverized silicates and diluted or undiluted zeolites, using various adhesives such as waterglass, alkalies and alkali metal salts followed by calcination at 400 to 500° C. and if desired treatment with inorganic acids such as sulphuric acid, nitric acid, hydrochloric acid and the like.

In coating such carrier fragments an undiluted vanadyl base exchange body can be applied, especially when generated in situ. For the preparation of such an undiluted vanadyl base exchange body it is only necessary to omit the diluent bodies, as described in the foregoing examples. In order to get a good coating on the carrier fragments, if necessary, various adhesives can be used, such as, for example, alkaline and neutral salts of the alkali-forming metals, such as, sulphates, chlorides, nitrates, waterglass, carbonates, hydroxides and the like.

The ratio of coating is about 1 kg. by weight of diluted or undiluted vanadyl base exchange body per 10 liters of pea sized carrier fragments.

Instead of introducing diluent bodies into the base exchange body during formation, as described in the foregoing examples, the undiluted base exchange body can be prepared from its components, potassium vanadite and vanadyl sulphate and mixed mechanically in aqueous suspensions with diluent bodies, or the base exchange body may be dried and then pulverized and then mixed with the latter. For example, 50 parts of "Celite" brick particles may be used and the mixture formed into granules with any of the above described adhesives. The product thus produced is an efficient catalyst for the catalytic oxidation of $SO_2$ to $SO_3$ when 6-8% burner gases at the usual gas velocities are passed over these contact masses at a temperature range of 430 to 550° C.

*Example 4.*

20 parts of $V_2O_5$ in 500 parts of water acidified with a small amount of concentrated sulphuric acid are reduced to vanadyl sulphate by reducing agents such as, gases containing $SO_2$. The blue solution obtained is treated with sufficient 2 N. potassium hydroxide solution to precipitate a voluminous brown precipitate of $V_2O_4$ which is then sucked and suspended in 200 parts of water. This suspension is gradually warmed to 60–70° and sufficient 2 N. potassium hydroxide solution is added until the $V_2O_4$ dissolves to a coffee brown solution. This requires an excess of potassium hydroxide.

The potassium vanadite thus produced is then stirred with 60 to 80 parts of diatomite brick refuse or other materials rich in silica, such as, diluted or undiluted base exchanging aluminum polysilicates or ground glaucosil which is the silicious residue from the acid extraction of green sand, and 2 N. sulphuric acid is gradually poured into the suspension with vigorous agitation until the latter just remains alkaline to phenolphthalein.

The sulphuric acid brings down a brown precipitate which is pressed and then dried at temperatures below 100° C.

The product thus obtained which is a vanadyl base exchange body is saturated with dilute waterglass solution formed of 100 parts of 33° Bé. waterglass solution diluted with 100 to 150 parts of water.

After impregnation the product is again dried and broken into fragments and treated at 450 to 500° C. with 7% burner gases. In a short time an excellent contact sulphuric acid process sets in.

Instead of using this $SO_2$ gas concentration lower percentages and higher percentages of $SO_2$ gas can be used with great success giving good conversions to $SO_3$.

This contact mass shows a good resistance to the high temperatures often obtained in the contact sulphuric acid process.

*Example 5.*

20 parts of $V_2O_5$ are reduced to a vanadyl sulphate solution as described in the foregoing example and are diluted with about 70 parts of unground infusorial earth. 2 N. potassium hydroxide solution is added in portions with vigorous agitation until the mixture just remains alkaline or neutral to phenolphthalein.

The body precipitated is treated in the usual manner as described in the foregoing examples and is also a contact mass of excellent catalytic efficiency for the contact sulphuric acid process, using 6–8% burner gases at a temperature of 550 to 430° in the gas flow through the converter, whereby a high percentage conversion of $SO_2$ to $SO_3$ is obtained.

*Example 6.*

The diluted base exchange bodies, as described in the foregoing examples in which the diluents are incorporated into the base exchange body during its formation, are prepared with diluents which have been impregnated uniformly with 5 to 10% iron silicate, silver silicate, copper silicate or their mixtures, and the like, produced by reaction of the corresponding nitrates with diluted water glass solutions. This impregnation is carried out as follows: The diluents such as diatomite brick refuse or comminuted glaucosil, are suspended in sufficient water and the proper amount of diluted waterglass solution, about 10%, is added to the suspension and then a corresponding amount of 10% of the nitrate solution is added to precipitate out the silicate in a very fine distribution.

These diluted base exchange bodies, when broken in small pieces, are calcined with air at about 400° C. and afterwards pretreated with 3 to 4% $SO_2$ gases at 400 to 500° C.

The silicates embedded with the diluents in these base exchange bodies act as stabilizer promoters in the contact sulphuric acid process and such contact masses are very resistant to high temperatures.

*Example 7.*

12 parts of vanadic acid are treated with sufficient 2 N. potassium hydroxide solution so that not only is all of the $V_2O_5$ dissolved in the form of potassium vanadate but an excess of 14 parts of 100% KOH remains. A mixture of 120 parts of comminuted quartz and 20 parts of kieselguhr is impregnated with the above described solution.

The second base exchange body component necessary is prepared by reducing 10 parts of vanadic acid to vanadyl sulphate in the usual manner and neutralizing the excess sulphuric acid with 2 N. potassium hydroxide solution.

Solution 2 and suspension 1 are then kneaded together thoroughly and dried at temperatures below 100° C.

The product thus obtained is a base exchanging body containing $V_2O_5$ and $V_2O_4$. The large lumps of this product are then broken into small fragments of suitable size to be filled in contact sulphuric acid converters and after preliminary treatment with 3 to 6% burner gases at 450 to 500° C. an excellent contact sulphuric acid process sets in.

*Example 8.*

18 parts of vanadium pentoxide are suspended in 300 parts of water rendered weakly acid with concentrated sulphuric acid and reduced with well known reducing means such as, for example, sulphur dioxide, to blue vanadyl sulphate in the usual manner. The solution is boiled and concentrated to 150 parts of water.

10 parts of aluminum oxide are transferred into potassium aluminate by means of 5 N. sodium hydroxide solution.

⅓ of the vanadyl sulphate solution, described above, is treated with 10 N. potassium hydroxide solution to transform it into coffee-brown potassium vanadite which is then mixed with the sodium aluminate solution and 100 parts of infusorial earth or natural or artificial base exchanging aluminum polysilicates added. To this solution is added the potassium aluminate solution and then the remaining ⅔ of the vanadyl sulphate solution are added with vigorous agitation, care being taken that the final reaction product remains strongly alkaline to litmus.

The product is pressed, dried as usual under 100° C., broken into fragments and if necessary sprayed with about 10% sulphuric acid until the so-called salt-like body is formed with the potassium vanadyl aluminum base exchange body which is diluted with infusorial earth. During the spraying the fragments should preferably be heated and stirred.

This contact mass has a high catalytic efficiency for the contact sulphuric acid process giving excellent conversions at regular and somewhat higher loadings with 7 to 9% burner gases.

*Example 9.*

A diluted base exchange body is prepared, as described in Example 8, but instead of causing it to react with sulphuric acid to form a salt-like body it is digested for a considerable period of time with a 5% copper sulphate solution whereby part of the alkali is substituted by copper.

The product thus obtained is a good contact mass for the contact sulphuric acid process and shows a good resistance against high temperatures.

Instead of a copper sulphate solution, other salt solutions, such as a calcium chloride solution, titanium sulphate solution, aluminum sulphate solution and the like can be used singly or in admixture.

*Example 10.*

A base exchange body is prepared as described in Example 8 but instead of using 10 parts of aluminum oxide, 20 parts of aluminum oxide and a corresponding amount of potassium hydroxide is used, the potassium aluminate solution being diluted with 60 to 70 parts of kieselguhr, pumice fragments or quartz fragments, the alkali base exchange body being neutralized with sulphuric acid to form a salt-like body.

The aluminate solution can be wholly or partly substituted by potassium cadmiate.

This contact mass is also well suited for the contact sulphuric acid process using regular speeds of burner gases at temperatures between 430 and 550° C.

*Example 11.*

A vanadyl base exchange body is prepared by suspending 20 parts of $V_2O_5$ in 500 parts of water, adding a little concentrated sulphuric acid and then reducing the $V_2O_5$ with gases containing sulphur dioxide at the boiling point of the solution until it is completely transformed to blue vanadyl sulphate.

The vanadyl sulphate solution is then divided into two parts, half of which is treated at 50 to 60° C. with sufficient 5 N. KOH to form a clear coffee-brown solution of potassium vanadite to which 50 parts of "Celite" earth are added as a diluent, the second half of the original solution is added with vigorous agitation, care being taken that the alkalinity remains between phenolphthalein red and litmus blue. The reaction product is sucked but not dried and constitutes a vanadyl base exchange body.

10.2 parts of freshly precipitated aluminum oxide are brought into solution with 40 parts of 100% KOH in 200 parts of water. The vanadyl base exchange body described above is then stirred into the solution and a 10% aqueous solution containing 37 parts of ferric sulphate with 18 mols of water or 44.4 parts of aluminum sulphate with 18 mols of water or a mixture of the two, is added to the aluminate solution with vigorous agitation. A corresponding amount of titanium sulphate, zirconium nitrate, zinc-sulphate, thorium nitrate can also be used.

The reaction product is obtained, which is an aluminum base exchange body and which does not possess any catalytic properties for the catalytic oxidation of sulphur dioxide to sulphur trioxide, is diluted with catalytically active vanadyl base exchange body and is thereby transformed into a highly active catalyst for the above referred to process.

The reaction product is sucked, pressed, washed with 300 to 400 parts of water, dried and broken into fragments. The fragments may be treated with 5% copper sulphate, cobalt nitrate or iron sulphate solution to partly replace the alkali with these metals. This product may also be treated with salts of the metal oxygen acids of the 5th and 6th groups of the periodic system, preferably with a 1% ammonium vanadate solution, resulting in a so-called salt-like body after the soluble components have been washed out.

The products are calcined with air or gases containing carbon dioxide at 400° C., the calcination temperature being permitted to rise gradually in order to prevent undesirable changes in the structure of the base exchange body. After this preliminary calcination the product is then treated with 3 to 7% burner gases at 400° C. and is transformed into a contact mass for the contact sulphuric acid process which process may be carried out at temperatures of from 420 to 550° C.

In this example the aluminum-iron base exchange-body may be considered as a complex stabilizer and stabilizer promoter for the catalyst.

In order to promote or tune the stabilizer action of the catalyst also various stabilizer promoters can be added in the form of sillicates or heavy metal oxides such as ferric oxide, copper oxide, titanium dioxide, manganese dioxide, zirconium dioxide, cerium dioxide, beryllium oxide, calcium oxide, cobalt oxide or thorium dioxide. They may be added singly or in mixtures and may advantageously be formed in nascent state. The amount of the stabilizer promoter added depends on the effect desired; in general from 2 to 5% of such stabilizer promoters gives good results. These stabilizer promoters, of course, may be added in the same manner as any other diluent as has been generally described in several of the foregoing examples.

A different method of introducing the stabilizer promoters consists in substituting part or all of the metal salt components of the base exchanging body with corresponding amounts of 5 to 10% solutions of beryllium sulphate, silver nitrate, nickel sulphate, or similar mineral acid salts of these bases.

Instead of embedding the catalytically active vanadyl base exchange body in the inactive base exchange body, described above, this, or other catalytically active diluted or undiluted base exchange bodies of this class, can be embedded either in the well known diluted or undiluted base exchanging polysilicates or artificial neutral polysilicates.

Base exchanging aluminum iron, cadmium, titanium, silver, copper, manganese, 2 or 3 component polysilicates are excellently suited for this purpose.

*Example 12.*

20 parts of a 33° Bé. sodium waterglass solution are diluted with 10 volumes of water and sufficient 5% iron sulphate, copper sulphate, or silver nitrate solution is added to bring about a neutral reaction to litmus. The precipitate is sucked and thoroughly washed with water to remove the alkali metal salt, and then constitutes silicates of the metals used which can be further worked up without drying.

16 parts of $V_2O_5$ are treated with sufficient ½ N. KOH at an elevated temperature to dissolve the $V_2O_5$ as potassium metavanadate. To this solution are added 40 parts of 100% KOH dissolved in 200 parts of water and 60 parts of infusorial earth or twice as much quartz or pulverized silicate rock are stirred in. The heavy metal silicate described above is then also stirred in to produce a uniform distribution.

66 parts of aluminum sulphate with 18 mols of water or an equivalent amount of beryllium sulphate, cadmium sulphate, titanium sulphate or a mixture of them are dissolved in 250 parts of water and the solution is gradually poured into suspension containing the potassium vanadate at 40 to 60° C. If necessary, 2½ to 5% sulphuric acid can be added to bring the reaction to the desired alkalinity or neutrality to phenolphthalein in order to get the maximum yield. The reaction product obtained is then pressed and washed with 300 parts of water.

A product is obtained which is an aluminum base exchange body in which the $V_2O_5$ is present partly in chemically combined form and which product also contains as diluents the heavy metal silicates which may be considered as stabilizer promoters to tune to the desired extent the composite stabilizer formed by the aluminum base exchange body. The contact mass is dried below 100° C. in the usual manner, broken into fragments and then calcined with air at about 400° C. and constitutes an effective catalyst for the contact sulphuric acid process after it has received a preliminary treatment with gases containing 2 to 3% of $SO_2$ and excess oxygen at temperatures of about 400 to 500°. The contact mass may be used with 7 to 9% burner gases at working temperatures of 420 to 480° C. giving a high percentage conversion of $SO_2$ to $SO_3$ and displaying at the same time excellent resistance to high temperatures.

*Example 13.*

15 parts of $V_2O_5$ are dissolved in ½ N. KOH solution in the form of potassium metavanadate. 5 parts of freshly precipitated aluminum oxide are dissolved up in 35 to 40 parts of 100% KOH dissolved in 250 parts of water forming a potassium aluminate solution. The two solutions are poured together and a mixture of 20 parts of $TiO_2$ and 50 parts of kieselguhr are stirred in. Thereupon 17 parts of aluminum sulphate with 18 mols of water mixed with 20 parts of ferric sulphate having 9 mols of water are dissolved in about 300 parts of water and the solution is then gradually poured into the aluminate-vanadate suspension at temperatures of about 50 to 70° C. 5% sulphuric acid is then gradually added until the desired alkalinity or neutrality to phenolphthalein is obtained.

The reaction product produced is a vanadium-aluminum-iron base exchange body which contains, as a diluent, titanium oxide and kieselguhr. The product is freed from the mother liquor in the usual manner, washed with 3 to 4 times its weight of water and then dried at a temperature below 100° C. The product is then broken into fragments and is an excellent contact mass for the contact sulphuric acid process.

Under the usual reaction conditions, as described in the foregoing examples, part of the base exchange body components may be considered as stabilizers for the catalytically effective components and the titanium dioxide appears to act as a promotor for these stabilizers.

The contact mass can be also treated with water after drying in order to hydrate it and then calcined before use.

Heavy metals may also be introduced by base exchange or salt-like bodies may be prepared.

*Example 14.*

8 parts of $V_2O_5$ and 5.1 parts $WO_3$ are dissolved in 2 N. KOH containing 26 parts of 90% KOH. 80 parts "Celite" brick refuse or other acid resistant materials rich in silica are added. 22 parts of $Al_2(SO_4)_3$ 18 aq. are dissolved in about 100 parts of water.

The suspension 1 and the solution 2 are mixed together, adding the solution in small portions, care being taken that the reaction mixture remains strongly alkaline to litmus.

The paste obtained is freed from the mother liquor by pressing and is dried afterwards at temperatures under 100° C. and then broken in small pieces suitable for catalysis.

After drying it may be desirable sometimes to trickle water over the broken fragments in order to wash out the excess of salts formed in the preparation of this body.

The dried diluted base exchanging body containing $V_2O_5$, $WO_3$, $Al_2O_3$ in non-exchangeable form is treated at 420 to 500° C. with gases containing $SO_2$ and oxygen, first diluted and then of a concentration of 7–9% $SO_2$. The $SO_2$ gas may be obtained by burning sulphide ores and precipitating mechanically entrained dust.

Instead of using $Al_2(SO_4)_3$ as the salt component of the base exchange body, an equivalent amount of titanium sulphate, zirconium sulphate, chromium nitrate, or their mixtures, can be used.

Instead of $WO_3$ also $MoO_3$ can be used to prepare equally efficient contact masses.

In the preparation of such contact masses the $V_2O_5$ content can partly or wholly be replaced by a corresponding amount of $WO_3$. Contact masses however which do not contain $V_2O_5$ usually do not have as high a catalytic efficiency, but their efficiency in such base exchange bodies, is greatly enhanced by the advantageous physical structure of the base exchange body.

*Example 15.*

12 parts of $V_2O_5$ are suspended in 250 parts of water to form a slurry acidified with 5 parts of concentrated sulphuric acid and then reduced to the blue vanadyl sulphate in the usual manner, for example, by means of gases containing $SO_2$ which are passed into the solution at boiling temperature. 107 parts of waterglass solution at 33° Bé. are then diluted with 200 parts of water and about 60 parts of "Celite" stirred in. The waterglass solution is then poured into the vanadyl sulphate solution with vigorous agitation, precipitating out vanadyl silicate. Care should be taken that after all of the solutions have reacted the resulting mixture must be made neutral to litmus if necessary with the help of small amounts of N. sulphuric acid. 10 parts of freshly precipitated aluminum hydroxide are treated with sufficient ½ N. KOH solution to dissolve up the aluminum hydroxide in the form of potassium aluminate and to provide a 10% excess of KOH.

26.4 parts of $Cr(NO_3)_3$ 9 aq. are dissolved in 250 to 300 parts of water. The chromium may be partly or wholly replaced by equivalent amounts of titanium sulphate or aluminum sulphate.

Into the aluminate solution is then stirred the vanadyl silicate diluted with "Celite" and thereupon the chrominum salt solution is added producing a base exchange body in which the vanadyl silicate is homogeneously incorporated as a diluent.

The reaction product is treated in the usual way by pressing and drying below 100° C. and is broken into fragments. After hydration by trickling water over the fragments the exchange alkali part can be replaced by lead, using 5% lead nitrate solution. The alkali may also be exchanged for copper, silver, and nickel, using 5 to 10% solution, of the respective salts, the catalytic efficiency of such contact masses being thereby enhanced. Treatment with ammonium vanadate or molybdate, for the formation of the so-called salt-like bodies helps to increase the catalytic efficiency for the contact sulphuric acid process and also the resistance of such contact masses against high temperatures often obtained in this process.

*Example 16.*

10 parts of $Al_2O_3$, freshly precipitated are transformed into potassium aluminate with 2. N. potassium hydroxide solution. 10% of alkali in excess should be present in the aluminate solution.

66.6 parts $Al_2(SO_4)_3 18H_2O$ are dissolved in about 200 parts of water.

70 to 80 parts of "Celite" brick refuse or other comminuted acid resistant materials, such as glaucosil or neutral or base exchanging polysilicates, are stirred into the aluminate solution. The aluminum sulphate solution is added in small portions with vigorous agitation, care being taken that the reaction mixture remains strongly alkaline to litmus and preferably neutral or weakly alkaline to phenolphthalein.

The reaction product obtained is freed from mother liquor and dried at temperatures below 100° C. The material thus obtained is broken in small fragments and consists of a catalytically ineffective base exchanging body diluted with inactive materials.

The fragments are hydrated by trickling water over them and then the exchangeable alkali base is partly replaced by silver in the usual way, using 5% silver nitrate solution.

After this treatment the base exchange body is treated with 5 to 10% solutions of metallates of the elements of the 5th and 6th groups of the periodic system, especially with soluble vanadate solutions such as ammonium vanadate and potassium vanadate, in order to form the vanadate of the diluted base exchange body containing silver in exchangeable form.

After again drying the particles which now possess a perfectly uniform yellow color are calcinated first with air and then at 400 to 450° C., with $SO_2$ gases strongly diluted with air.

6 to 9% burner gases, freed from dust, but containing the so-called catalyst poisons are passed over this contact mass at 450 to 550° C. and in a short time a good contact sulphuric acid process starts, giving high percentage conversions at regular gas velocities, that is to say, when 200 volumes of the said contact mass are treated with 1300 to 1500 volumes of burner gases.

The aluminate component can be replaced wholly or partly by other amphoteric metallates such as those containing Zn, Be, Cd, Pb, singly or in admixture.

The aluminum sulphate component as the salt component of the base exchanging body can also wholly or partly be replaced by salt solutions such as the salts of Fe, Cr, Ni, Co, Mn, Cu, Be, Zr, Th, Ti, Ag, Cd, Sn, Ce, Pb, alone or in admixture.

*Example 17.*

20 parts of 33° Bé. sodium waterglass solution are diluted with 15 to 20 volumes of water and 60 to 80 parts of infusorial earth added. Sufficient 5% iron sulphate, copper sulphate, silver nitrate, calcium chloride, strontium chloride, and manganese nitrate solution, singly or in admixture are added with vigorous agitation to bring about a neutral reaction to litmus.

The precipitate is sucked and thoroughly washed with water to get the alkali metal salt out of it and then constitutes diluted neutral silicates of the metals used which can be further worked up without drying.

10 parts of $Al_2O_3$ freshly precipitated are transferred to potassium aluminate using a sufficient amount of 2 N. KOH solution and having an excess alkali of about 10 to 15%. The diluted silicate is kneaded with this solution as described above. 50 parts of $Al_2(SO_4)_3.18H_2O$ are dissolved in about 200 parts of water. The latter solution is then kneaded with the aluminate mixture and after addition of all the solution, an alkaline or neutral reaction to phenolphthalein should be obtained.

The diluted reaction product so obtained is freed from mother liquor by pressing, dried at temperatures under 100° C. and broken in pieces. The dried fragments are leached out by trickling water over them and then are treated with 5% vanadyl sulphate solution, chromium nitrate solution or uranyl nitrate solution or a mixture of them, in order to exchange, as far as possible, the alkali for these radicals. Thereupon impregnate the products with a diluted potassium or ammonium vanadate solution in order to form the so-called salt-like body, that is, the vanadate of the vanadyl base exchange body diluted with silicates and infusorial earth.

After drying and calcining, the contact mass thus obtained is treated with 6 to 9% burner gases at 430 to 550° C. developing a good working contact sulphuric acid process wherein the contact mass shows a good resistance against high temperatures obtaining in the process and against the usual gaseous catalytic poisons.

The silicates in this contact mass act as stabilizer promoters in the reaction.

The metallate component, as well as the metal salt component, can be wholly or partly replaced by corresponding elements as described in Example 16.

Instead of using neutral silicates as stabilizer promoters 5 to 10% of $TiO_2Fe_2O_3$ based on the amount of diluent used, can be thoroughly admixed.

The base exchange bodies, as described in Examples 16 and 17, can also be prepared by the other methods as described in the specification.

*Example 18.*

1. A mixture of 10 parts of $V_2O_5$ and 4 parts of $WO_3$ are dissolved in 300 parts of diluted KOH solution containing 10.5 parts of 90% KOH. To this solution under vigorous agitation about 90 parts "Celite" brick refuse or a mixture of comminuted quartz and diatomaceous earth equal in volume to "Celite" brick refuse are added.

The suspension is heated up to 80-90° C. and is gradually made faintly acid to congo using 2 N. sulphuric acid in order to precipitate out in the diluted $V_2O_5$ and $WO_3$. The mixture obtained is then dried.

2. 22 parts of $Al_2(SO_4)_3$ 18 aq. are transformed in the usual way, by means of ammonia, to $Al(OH)_3$ and the wet $Al(OH)_3$ is dissolved in 14 parts of 90% KOH diluted with about 80 parts of water in order to form the corresponding aluminate.

The dried $V_2O_5$ and $WO_3$ is impregnated with the aluminate solution by kneading thoroughly and then formed in suitable pieces. These formed pieces are then dried at temperatures under 100° C. with $CO_2$ containing gases whereby a diluted base exchange body is obtained containing $V_2O_5$, $WO_3$ and $Al_2O_3$ in non-exchangeable form.

The contact mass so obtained is calcined with $SO_2$ gases greatly diluted by air and when treated with 7-9% burner gases a very efficient contact sulphuric acid process develops.

Instead of $V_2O_5$ and $WO_3$ other catalytically effective components can be used in this contact mass such as $V_2O_4$, $MoO_3$.

Instead of using a potassium aluminate solution other metallates of amphoteric elements can be used such as Cd, Cr and Be. In order to increase the resistance of such contact masses to high temperatures often obtaining in the contact sulphuric acid process so-called stabilizer promoters for example 5% $Fe_2O_3$, CuO, $TiO_2$ can be embedded during the formation of the contact mass.

*Example 19.*

1. 12 parts of $V_2O_5$ are dissolved in 150 to 200 parts of water containing 10 parts of 90% KOH.

2. 6 parts of $CuSO_4$ 5 aq. are dissolved in 150 to 200 parts of water and sufficient concentrated ammonia solution is added until a clear blue solution of the cuprammonium sulphate is obtained.

3. 5 parts of freshly precipitated $Al_2O_3$ are dissolved in the corresponding amount of 2 N. KOH solution in order to form the potassium aluminate.

The solutions #2 and #3 are poured together and 80 to 90 parts of "Celite" brick refuse are added in order to form a suspension of this diluent in the mixed solutions. Solution #1 is poured in with vigorous agitation and then a thin stream of 2 N. $H_2SO_4$ is added until the reaction mixture is slightly alkaline or neutral to phenolphthalein. The product so obtained is freed from the mother liquor by filtering and pressing. The press-cake is then dried at temperatures preferably below 100° C. and then broken in small fragments.

Before use this contact mass is calcined with air at 400° C. in order to dehydrate the mass.

2 to 4 volumes of the contact mass thus produced are filled in a sulphuric acid converter and 1000 to 2000 volumes of 7 to 9% burner gases are passed over the mass per hour at a temperature about 440 to 520° C. whereupon a very efficient contact sulphuric acid process sets in.

*Example 20.*

Pea sized quartz fragments are treated with a 20% solution of hydrofluoric acid in order to etch the surface of the quartz fragments. On these carrier fragments is formed a base exchange body containing platinum, the amount of coating being about 10% to volume of the carrier fragments.

Instead of forming the base exchange body in situ on the fragments, the finished base exchange body may be pulverized and afterwards coated on the carrier fragments with the help of adhesive substances such as waterglass $MgSO_4$, KOH, NaOH, and the like.

The base exchange body is prepared in the following way:

5 parts of $Al_2O_3$ are transformed into potassium aluminate using a 5 N. potassium hydroxide solution and after the formation of the potassium aluminate an excess of alkali amounting to 10–15% should be present. 4 parts of $H_2PtCl_6$ as a 10% solution are then added to the aluminate solution with vigorous agitation. 22 parts of $Fe_2(SO_4)_3$ 9 aq. are dissolved in 200 parts of water and are then added gradually with vigorous agitation, care being taken that the resulting reaction product remains slightly alkaline or neutral to phenolphthalein.

The base exchange body obtained and containing aluminum, iron and platinum in non-exchangeable form is freed from the mother liquor by pressing and dried at temperatures of about 100° C.

Instead of an undiluted base exchange body a diluted base exchange body can be used, especially when using powdered quartz or material rich in silica such as colloidal $SiO_2$, kieselguhr and the like, and it is an effective catalyst for the contact sulphuric acid process and can also be coated on to carrier fragments as described above whereby a large saving of platinum is obtained.

*Example 21.*

6.7 parts of freshly precipitated $Al_2O_3$ are mixed with 12 parts $V_2O_5$ and sufficient crystallized oxalic acid or other reducing agents, such as powdered carbon, are added to reduce the $V_2O_5$ in the reaction mixture to $V_2O_4$. Thereupon 11 parts of 100% KOH or 13 parts of $K_2CO_3$ are thoroughly mixed with the others. The entire mixture is then heated up to the sintering point or to incipient melting.

The melted mass is crushed to small pieces and leached out with water in order to remove excessive alkali. The catalytically active base exchange body thus obtained is ground and then embedded in a catalytically inactive zeolite body as follows:

90 parts of 33° Bé. waterglass are diluted with 5 to 10 volumes of water and the base exchange body obtained as described above together with 80 parts of infusorial earth are added with vigorous stirring in order to obtain a good distribution. 60 parts of aluminum sulphate with 18 mols of water are dissolved in 200 parts of water and sufficient 10 N. potassium hydroxide solution is added to dissolve up the aluminum oxide which is at first precipitated forming a potassium aluminate solution. The aluminate solution is then stirred into this suspension and the mixture heated up to about 60 to 70° C. A gelatinous precipitate is obtained almost at once and is increased by the gradual addition of 2 N. sulphuric acid. Care should be taken, however, that alkalinity to litmus or neutrality to phenolphthalein is maintained. The stirring is continued for an hour during which period the mixture is gradually permitted to cool down to room temperature. The gelatinous precipitate obtained is pressed and washed with 200 parts of water in small portions. The filter cake is then dried at about 80° C. and broken into fragments of suitable size. The mass obtained, after careful calcination, for purposes of dehydration, consists of an efficient contact mass for the contact sulphuric acid process under reaction conditions as described in the foregoing examples.

*Example 22.*

60 to 80 parts of "Celite" brick refuse are impregnated with an ammoniacal silver vanadate solution prepared by causing 18 parts of $V_2O_5$ in the form of sodium metavanadate dissolved in 250 parts of water to react with 34 parts of silver nitrate also dissolved in about 250 parts of water.

The yellow silver vanadate which is precipitated is then separated from the mother liquor in the usual manner and suspended in about 100 parts of water in the form of a slurry. 20 per cent ammonia water is added until all of the silver vanadate dissolves. After the impregnation of the "Celite" brick refuse with this solution, the impregnated material is warmed to completely drive off the ammonia.

7.75 parts of $WO_3$ are dissolved with ½ N. KOH solution of potassium tungstate.

3.4 parts freshly precipitated $Al_2O_3$ are dissolved in N. KOH solution in order to form the potassium aluminate.

The two solutions are poured together and under vigorous stirring the diluent impregnated with silver vanadate is added. After formation of a good mixture the diluted base exchange body is precipitated out with the help of N. $H_2SO_4$ which is added gradually but care must be taken that the final reaction product reacts alkaline or neutral to phenolphthalein. The reaction mixture is freed from the mother liquor by suction and is washed with about 200 parts of water and then dried at temperatures preferably below 100° C. The dried precipitate is broken into small fragments suitable for the contact sulphuric acid process and then carefully calcined with air at about 400° C.

The calcined contact mass after pretreating with diluted burner gases for a short while develops, with 6 to 9% burner gases, an efficient contact sulphuric acid process at 420 to 550° C. using the well known gas velocities.

This contact mass consists of a base exchange body containing tungsten and aluminum in non-exchangeable form which combination has catalytic efficiency in the contact sulphuric acid process. The diluent embedded in this catalytic active base exchange body is a further catalytically active component in the process and the combination of both creates an efficient contact mass.

Instead of embedding silver vanadate other vanadates can be used especially the vanadates of the heavy metals, such as, copper, iron, cobalt and the like.

Also, for the preparation of the base exchange body other catalytically active components, such as, $V_2O_5$, $V_2O_4$, $MoO_3$, and instead of aluminum, also other amphoteric metal oxides, can be applied whereby effective catalysts will be obtained.

*Example 23.*

6 parts of $V_2O_5$ are suspended in 150 parts of water to form a slurry acidified with 5 parts of concentrated sulphuric acid and then reduced to the blue vanadyl sulphate in the usual manner. For example, by means of gases containing $SO_2$ which are passed into the solution at the boiling temperature. 54 parts of a waterglass solution of 33° Bé. are diluted with 100 parts of water and about 60 parts of "Celite" brick refuse are stirred in. The waterglass solution is then poured into the vanadyl sulphate solution with vigorous agitation, precipitating out vanadyl silicate. Care should be taken that after all the solutions have reacted, the resulting mixture must be made neutral to litmus, if necessary with the help of small amounts of N. sulphuric acid.

10 parts of freshly precipitated aluminum oxide are treated with sufficient ½ N. KOH solution to dissolve up the aluminum oxide in the form of potassium aluminate and to provide a 5–10% excess of KOH.

6 parts of $V_2O_5$ are transformed, as described above, to vanadyl sulphate and dissolved in about 250 to 300 parts of water. The vanadyl silicate obtained above is stirred into the vanadyl sulphate solution and under vigorous agitation the potassium aluminate is added and a base exchange body is obtained containing $V_2O_4$ and $Al_2O_3$ in non-exchangeable form diluted with vanadyl silicate and "Celite" brick refuse. In adding the potassium aluminate, care should be taken that the reaction mixture must react at least neutral or alkaline to phenolphthalein, small amounts of additional alkali being used if necessary.

The reaction mixture is separated from the mother liquor in the usual way and then dried and broken into suitable pieces. After calcining to dehydrate the contact mass diluted $SO_2$ gases are first passed over the contact mass for a short time and then 7–9% burner gases whereupon a very efficient contact sulphuric acid process sets in at temperatures between 420 and 550° C.

It will be noted that in Example 23, the metallate solution is added to the metal salt solution instead of vice versa in the other examples. I find that for most contact masses it is desirable to add the metal salt solution to the metallate solution in order to assure a suitable alkalinity of reaction mixture thruout the whole reaction. Some very effective contact masses such as that described in Example 23 may be produced by the converse method of adding the metallate to the metal salt solution and processes using such contact masses are included in the present invention.

In the claims and specification the term "base exchange body" is strictly limited to products which are analogous to the zeolites but do not contain silicon and are capable of reversibly exchanging bases with salt solutions. The expression does not cover ordinary salts which are capable of undergoing metathesis in which their basic radical may be exchanged for another base. Such products do not permit reversible base exchange as do the products of the present invention and as do the zeolites. The term "base exchange body" is accordingly strictly limited to products which reversibly exchange their bases after the nature of zeolites.

What is claimed as new is:

1. A process of catalytically oxidizing sulphur dioxide to sulphur trioxide, which comprises passing a gaseous mixture containing sulphur dioxide and oxygen at an elevated temperature over a catalyst which contains at least one catalytically active non-silicious base exchange body.

2. A process of catalytically oxidizing sulphur dioxide to sulphur trioxide, which comprises passing a gaseous mixture containing sulphur dioxide and oxygen at an elevated temperature over a catalyst which contains at least one non-silicious base exchange body, containing at least one catalytically active component chemically combined in non-exchangeable form.

3. A process of catalytically oxidizing sulphur dioxide to sulphur trioxide, which comprises passing a gaseous mixture containing sulphur dioxide and oxygen at an elevated temperature over a catalyst which contains at least one catalytically active non-silicious base exchange body which contains no elements of the platinum group.

4. A process according to claim 3, in which the reaction gases are freed from mechanically entrained dust before passing over the catalyst, but which contains poisons for platinum catalysts.

5. A process of catalytically oxidizing sulphur dioxide to sulphur trioxide, which comprises passing a gaseous mixture containing sulphur dioxide and oxygen at an elevated temperature over a catalyst which contains at least one catalytically active base exchange body containing vanadium in non-exchangeable form.

6. A process of catalytically oxidizing sulphur dioxide to sulphur trioxide, which comprises passing a gaseous mixture containing sulphur dioxide and oxygen at an elevated temperature over a contact mass which contains at least one catalytically active non-silicious base exchange body admixed with diluent bodies to form a physical homogeneous structure.

7. A process of catalytically oxidizing sulphur dioxide to sulphur trioxide, which comprises passing a gaseous mixture containing sulphur dioxide and oxygen at an elevated temperature over a contact mass which contains at least one catalytically active non-silicious base exchange body coated onto massive carrier fragments.

8. A process, according to claim 6, in which the diluents contain stabalizer promoters.

9. A process, according to claim 6, in which the diluents contain catalytically ineffective base exchange bodies.

10. A process according to claim 6, in which the diluents contain zeolites.

11. A process of catalytically oxidizing sulphur dioxide to sulphur trioxide, which comprises passing a gaseous mixture containing sulphur dioxide and oxygen at an elevated temperature over a catalyst which contains at least one non-silicious base exchange body which has been caused to react with at least one catalytically effective acid radical to form therewith a salt-like body.

12. A process of catalytically oxidizing sulphur dioxide to sulphur trioxide, which comprises passing a gaseous mixture containing sulphur dioxide and oxygen at an elevated temperature over a catalyst which contains at least one non-silicious base exchange body which has been caused to react with a vanadium-containing acid radical to form a salt-like body.

13. A process, according to claim 11, in which the non-silicious base exchange body is catalytically ineffective.

14. A process, according to claim 12, in which the non-silicious base exchange body is catalytically ineffective.

Signed at Pittsburgh, Pennsylvania, this 28th day of July, 1927.

ALPHONS O. JAEGER.